(12) United States Patent
Hiyama et al.

(10) Patent No.: US 12,204,036 B2
(45) Date of Patent: Jan. 21, 2025

(54) ATTITUDE MEASURING DEVICE, ATTITUDE MEASURING METHOD AND ATTITUDE MEASUREMENT PROGRAM

(71) Applicant: Furuno Electric Co., Ltd., Hyogo (JP)

(72) Inventors: Ei Hiyama, Osaka (JP); Masashi Sugimoto, Itami (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 75 days.

(21) Appl. No.: 17/649,302

(22) Filed: Jan. 28, 2022

(65) Prior Publication Data
US 2022/0221593 A1 Jul. 14, 2022

Related U.S. Application Data

(63) Continuation of application No. PCT/JP2020/026575, filed on Jul. 7, 2020.

(30) Foreign Application Priority Data

Aug. 1, 2019 (JP) .................................. 2019-142035

(51) Int. Cl.
G01S 19/54 (2010.01)
(52) U.S. Cl.
CPC ..................................... *G01S 19/54* (2013.01)
(58) Field of Classification Search
CPC .......... G01S 19/54; G01S 19/47; G01S 19/14; G01S 19/36; G01S 19/396; G01S 5/01
See application file for complete search history.

(56) References Cited

U.S. PATENT DOCUMENTS

| 5,548,293 A | 8/1996 | Cohen |
|---|---|---|
| 6,421,003 B1 | 7/2002 | Riley et al. |

(Continued)

FOREIGN PATENT DOCUMENTS

| JP | H0540162 A | 2/1993 |
|---|---|---|
| JP | 2001281321 A | 10/2001 |

(Continued)

OTHER PUBLICATIONS

JP2007163335A_Description_20230516_0950.pdf—translation of JP-2007163335-A (Year: 2007).*

(Continued)

*Primary Examiner* — Olumide Ajibade Akonai
*Assistant Examiner* — Yonghong Li
(74) *Attorney, Agent, or Firm* — Alleman Hall & Tuttle LLP

(57) ABSTRACT

The present disclosure measures an attitude even when an antenna cannot receive a positioning signal a receiver cannot acquire positioning information from the signal. An attitude measuring device includes: antennas, receivers, and processing circuitry. The antennas receive positioning signals and output reception signals, respectively. There are four or more antennas. The receivers are provided for the respective antennas and output positioning data containing a carrier phase based on the reception signals. The processing circuitry calculates the position of each antenna using the relevant positioning data, estimates a reception state of the positioning data based on the calculated position, and selects between a first attitude calculation mode using four or more positioning data with a good reception state and a second attitude calculation mode using three or less positioning data with the good reception state. The processing circuitry calculates an attitude using the selected attitude calculation mode.

20 Claims, 9 Drawing Sheets

(56) References Cited

U.S. PATENT DOCUMENTS

| | | | |
|---|---|---|---|
| 7,355,549 B2 * | 4/2008 | Fukuda | G01S 19/41 342/357.38 |
| 10,197,681 B2 | 2/2019 | Nakamura et al. | |
| 10,514,469 B2 | 12/2019 | Fujisawa et al. | |
| 2016/0320190 A1 * | 11/2016 | Wu | G01C 23/005 |
| 2017/0363749 A1 * | 12/2017 | Fujisawa | G01S 19/54 |

FOREIGN PATENT DOCUMENTS

| | | | |
|---|---|---|---|
| JP | 2006023167 A | | 1/2006 |
| JP | 2006126181 A | * | 5/2006 |
| JP | 2007163335 A | * | 6/2007 |
| JP | 2008014721 A | | 1/2008 |
| JP | 2010232994 A | * | 10/2010 |
| JP | 2015025671 A | | 2/2015 |
| WO | 2016104032 A1 | | 6/2016 |
| WO | 2016104033 A1 | | 6/2016 |

OTHER PUBLICATIONS

JP2006126181A_Description_20240529_0841.pdf—translation of JP2006126181A (Year: 2006).*
JP2006126181A_Fig6_translate.pdf (Year: 2006).*
JP2006126181A_Fig10_translate.pdf (Year: 2006).*
JP2010232994A_Description_20240910_1402.pdf—translation of JP2010232994A (Year: 2010).*
ISA Japan Patent Office, International Search Report Issued in Application No. PCT/JP2020/026575, Sep. 29, 2020, WIPO, 6 pages.
European Patent Office, Extended European Search Report Issued in Application No. 20847188.8, Jul. 21, 2023, Germany, 13 pages.
Falco, G. et al., "Low-cost Real-time Tightly-Coupled GNSS/INS Navigation System Based on Carrier-phase Double-differences for UAV Applications," Proceedings of the 27th International Technical Meeting of the Satellite Division of the Institute of Navigation, Sep. 8, 2014, Tampa, FL, 17 pages.

* cited by examiner

| NUMBER OF NORMAL ANTENNA(S) N | N=1 | N=2 | | | N=3 | | N=4 |
|---|---|---|---|---|---|---|---|
| FAILURE STATE | ✗✗ / ✗✗ | ● ● / ✗✗ | ✗✗ ● / ✗✗ ● | ✗✗ ● / ● ✗✗ | ● ● / ● ✗✗ | ● ✗✗ / ● ● | ● ● / ● ● |
| POSITION | ○ | ○ | ○ | ○ | ○ | ○ | ○ |
| SPEED | ○ | ○ | ○ | ○ | ○ | ○ | ○ |
| AZIMUTH (YAW) ANGLE $\psi g$ | ✗ | ○ | ○ | ○ | ○ | ○ | ○ |
| ROLL ANGLE $\phi g$ | ✗ | ✗ | ✗ | ✗ | ○ | ○ | ○ |
| PITCH ANGLE $\theta g$ | ✗ | ○ | ✗ | ✗ | ○ | ○ | ○ |
| INERTIA SENSOR | $\psi_i, \phi_i, \theta_i$ | $\phi_i$ | $\theta_i$ | $\phi_i, \theta_i$ | — | — | — |

FIG. 7

ATTITUDE MEASURING DEVICE, ATTITUDE MEASURING METHOD AND ATTITUDE MEASUREMENT PROGRAM

CROSS-REFERENCE TO RELATED APPLICATION(S)

This application is a continuation of PCT International Application No. PCT/JP2020/026575, which was filed on Jul. 7, 2020, and which claims priority to Japanese patent Application No. 2019-142035 filed on Aug. 1, 2019, the entire disclosures of each of which are herein incorporated by reference for all purposes.

TECHNICAL FIELD

The present disclosure relates to an art for measuring the attitude of a movable body by using reception signals of GNSS signals.

BACKGROUND

Patent Document 1 discloses a device which receives radio waves from satellites and measures a position, an altitude, a speed, a direction, etc. of a movable body.

REFERENCE DOCUMENT OF CONVENTIONAL ART

Patent Document

Patent Document 1 JP1993-040162A

DESCRIPTION OF THE DISCLOSURE

However, according to the conventional attitude measuring device as disclosed in Patent Document 1 which is provided with a plurality of antennas for receiving positioning signals, it cannot measure the attitude, if not all the antennas could receive the positioning signals.

Thus, one purpose of the present disclosure is to provide an art for measuring an attitude as precise as possible, even if there is an antenna which cannot receive a positioning signal, or there is a receiving module which cannot acquire positioning information from the positioning signal.

SUMMARY

An attitude measuring device according to the present disclosure includes a plurality of antennas, a plurality of receiving modules, a position calculating module, a reception state estimating module, a mode selecting module, and an attitude calculating module. The plurality of antennas receive positioning signals and output reception signals, respectively. The plurality of antennas include four or more antennas. The receiving modules are provided for the respective antennas and configured to output positioning data containing a carrier phase based on the reception signals. The position calculating module carries out a positioning calculation of the position of each antenna by using the positioning data relevant to each antenna and outputs a positioning calculation result. The reception state estimating module estimates a reception state of the positioning data based on the positioning calculation result. The mode selecting module selects between a first attitude calculation mode using four or more positioning data with a good reception state and a second attitude calculation mode using three or less positioning data with the good reception state. The attitude calculating module calculates an attitude by using the selected attitude calculation mode.

According to this configuration, according to the reception state of each set of the plurality of antennas and the reception modules, the attitude is calculated using the positioning data of the sets of which the reception states are good.

According to the present disclosure, even if there is an antenna which cannot receive a positioning signal, or there is a receiving module which cannot acquire positioning information from the positioning signal, an attitude can be calculated as precise as possible.

BRIEF DESCRIPTION OF DRAWINGS

FIG. 7 is a table illustrating a relation between the number of normal sets N, a failure state, a position, a speed, and an attitude angle in a positioning coordinate system, and an attitude angle in an inertia sensor system.

DETAILED DESCRIPTION

Embodiment 1

Figure 1:
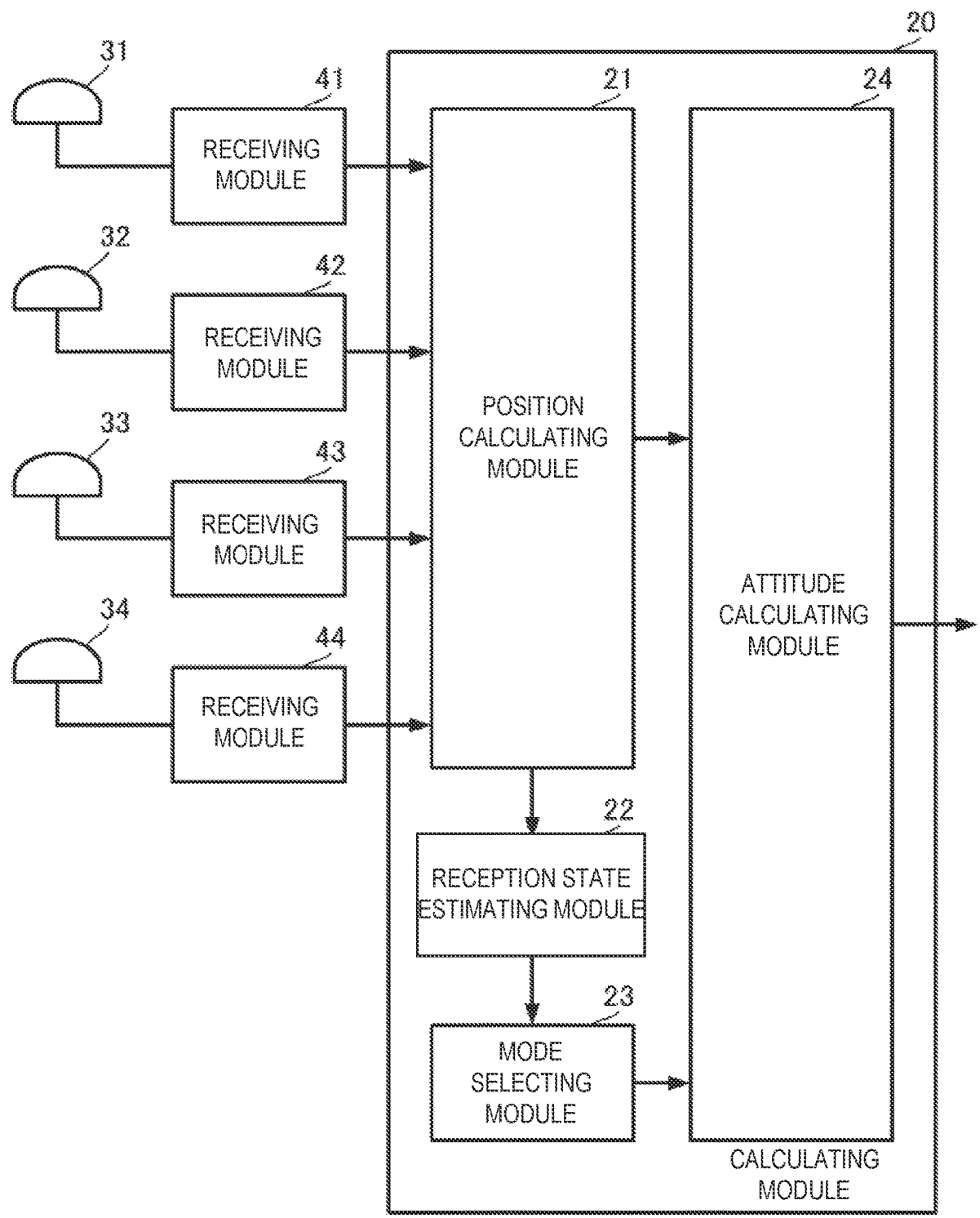
FIG. 1 is a functional block diagram illustrating a configuration of an attitude measuring device according to Embodiment 1.
Figure 2:
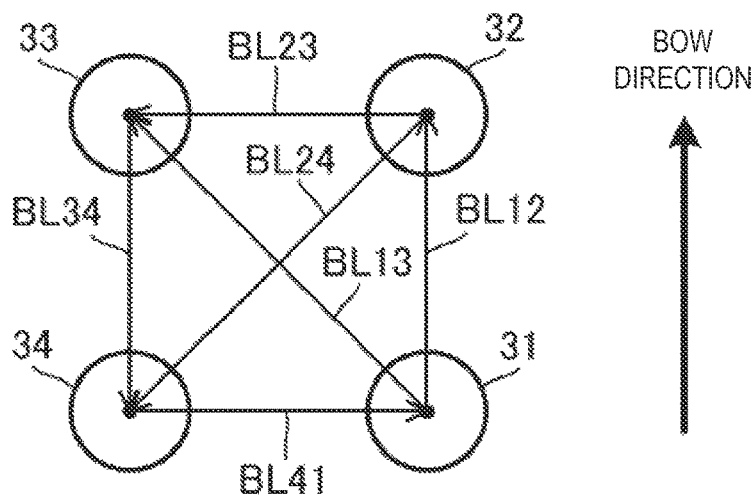
FIG. 2 is a schematic plan view illustrating a layout of antennas according to Embodiment 1.

An attitude measuring device, an attitude measuring method, and an attitude measurement program according to Embodiment 1 is described with reference to the drawings. FIG. 1 is a functional block diagram illustrating a configuration of the attitude measuring device according to Embodiment 1. FIG. 2 is a schematic plan view illustrating a layout of antennas according to Embodiment 1.

As illustrated in FIG. 1, an attitude measuring device 10 may include a calculating module 20 (processing circuitry), four antennas 31-34, and four receiving modules (receivers) 41-44. The four receiving modules 41-44 are implemented by electronic circuit(s), for example. The calculating module 20 is implemented by an IC where processing of the calculating module 20 is incorporated, or a processing unit (processor) such as a computer, for example. Note that the four antennas 31-34 and the four receiving modules 41-44 may be configured separately from the attitude measuring device 10. That is, the attitude measuring device may be comprised only of the calculating module 20. Further, the attitude measuring device may be comprised of the four receiving modules 41-44 and the calculating module 20.

The calculating module 20 may include a position calculating module 21, a reception state estimating module 22, a mode selecting module 23, and an attitude calculating module 24.

The four antennas 31-34 may be installed in a movable body or an object for which the attitude is to be measured. The movable body may be a ship, for example. Below, one example where the movable body is a ship is described.

The four antennas 31-34 are disposed as illustrated in FIG. 2, for example. In detail, the four antennas 31-34 may be disposed at corners of a square in a plan view. The antennas 31 and 32 may be disposed so that they are separated from each other in a direction parallel to the bow direction. Similarly, the antennas 33 and 34 may be disposed so that they are separated from each other in a direction parallel to the bow direction. The antennas 31 and 34 may be disposed so that they are separated from each other in a direction parallel to a port-and-starboard direction perpendicular to the bow direction. The antennas 32 and 33 may be disposed so that they are separated from each other in a direction parallel to the port-and-starboard direction. According to this configuration, six base-line vectors BL12, BL23, BL34, BL41, BL13, and BL24 may be formed. The base-line vector BL12 may be a vector starting from the antenna 31 and ending at the antenna 32. The base-line vector BL23 may be a vector starting from the antenna 32 and ending at the antenna 33. The base-line vector BL34 may be a vector starting from the antenna 33 and ending at the antenna 34. The base-line vector BL41 may be a vector starting from the antenna 34 and ending at the antenna 31. The base-line vector BL13 may be a vector starting from the antenna 31 and ending at the antenna 33. The base-line vector BL24 may start from the antenna 32 and end at the antenna 34.

The base-line vector BL12 and the base-line vector BL34 may be parallel to the bow direction. The base-line vector BL12 and the base-line vector BL34 may be opposite in the direction. The base-line vector BL23 and the base-line vector BL41 may be perpendicular to the bow direction (parallel to the port-and-starboard direction). The base-line vector BL23 and the base-line vector BL41 may be opposite in the direction. The base-line vector BL13 and the base-line vector BL24 may make about 45° to the bow direction. The base-line vector BL13 and the base-line vector BL24 may make about 90° therebetween.

Thus, the antenna 31-34 may be disposed so that at least one of the base-line vectors is parallel to the bow direction.

The antennas 31-34 may receive positioning signals from positioning satellites for output. The positioning signal may be a signal which is a carrier signal modulated by a pseudo-noise code. Navigation message including the positions etc. of the positioning satellites may be superimposed on the carrier phase. The antennas 31-34 may receive the positioning signals from a plurality of positioning satellites. The number of receiving positioning signals may be preferably four or more.

The receiving module 41 may be connected to the antenna 31. The positioning signal received by the antenna 31 (the reception signal of the antenna 31) may be inputted into the receiving module 41. The receiving module 41 may acquire and track the reception signal of the antenna 31 to generate positioning data. The positioning data may include a carrier phase, a code phase, etc. which are measured during the tracking. The receiving module 41 may output the positioning data relevant to the antenna 31 to the position calculating module 21.

The receiving module 42 may be connected to the antenna 32. The positioning signal received by the antenna 32 (the reception signal of the antenna 32) may be inputted into the receiving module 42. The receiving module 42 may acquire and track the reception signal of the antenna 32 to generate the positioning data. The positioning data may include the carrier phase, the code phase, etc. which are measured during the tracking. The receiving module 42 may output the positioning data relevant to the antenna 32 to the position calculating module 21.

The receiving module 43 may be connected to the antenna 33. The positioning signal received by the antenna 33 (the reception signal of the antenna 33) may be inputted into the receiving module 43. The receiving module 43 may acquire and track the reception signal of the antenna 33 to generate the positioning data. The positioning data may include the carrier phase, the code phase, etc. which are measured during the tracking. The receiving module 43 may output the positioning data relevant to the antenna 33 to the position calculating module 21.

The receiving module 44 may be connected to the antenna 34. The positioning signal received by the antenna 34 (the reception signal of the antenna 34) may be inputted into the receiving module 44. The receiving module 44 may acquire and track the reception signal of the antenna 34 to generate the positioning data. The positioning data includes the carrier phase, the code phase, etc. which are measured during the tracking. The receiving module 44 may output the positioning data relevant to the antenna 34 to the position calculating module 21.

At least one of the receiving modules 41-44 may output to the position calculating module 21 the navigation message which is demodulated by the tracking of the reception signal.

The position calculating module 21 may carry out an independent positioning calculation of the position of the antenna 31 by using the positioning data and the navigation message relevant to the antenna 31. The position calculating module 21 may carry out an independent positioning calculation of the position of the antenna 32 by using the positioning data and the navigation message relevant to the antenna 32. The position calculating module 21 may carry out an independent positioning calculation of the position of the antenna 33 by using the positioning data and the navigation message relevant to the antenna 33. The position calculating module 21 may carry out an independent positioning calculation of the position of the antenna 34 by using the positioning data and the navigation message relevant to the antenna 34.

The position calculating module 21 may output to the reception state estimating module 22 and the attitude calculating module 24 the position calculated by the independent positioning calculation as a positioning calculation result. In this case, for example, when the position calculating module 21 is unable to calculate to the position for each set of antenna and receiving module, it may make the fact of being unable to calculate be included into each positioning calculation result as the positioning error information.

The reception state estimating module 22 may estimate a reception state of every set of antenna and receiving module by using the positioning calculation result for every antenna. In detail, the reception state estimating module 22 may estimate the reception state of the set of antenna 31 and receiving module 41 based on the positioning result of the antenna 31. If the position of the antenna 31 has been able to be calculated, the reception state estimating module 22 may estimate that the reception state of the set of antenna 31 and receiving module 41 is good. On the other hand, if the position of the antenna 31 has not been able to be calculated, the reception state estimating module 22 may estimate that the reception state of the set of antenna 31 and receiving module 41 is poor.

Similarly, the reception state estimating module 22 may estimate the reception state of the set of antenna 32 and receiving module 42 based on the positioning result of the antenna 32. The reception state estimating module 22 may estimate the reception state of the set of antenna 33 and receiving module 43 based on the positioning result of the antenna 33. The reception state estimating module 22 may estimate the reception state of the set of antenna 34 and receiving module 44 based on the positioning result of the antenna 34.

The reception state estimating module 22 may output the estimated reception state to the mode selecting module 23.

The mode selecting module 23 may select a mode of an attitude calculation by using the reception state. In detail, if the reception state is good for all the sets of antenna and receiving module, the mode selecting module 23 may select a first attitude calculation mode. If the reception state is not good for all the sets of antenna and receiving module, and if it is a threshold Nth or above for the mode selection, the mode selecting module 23 may select a second attitude calculation mode. Here, the mode selecting module 23 may set the positioning data to be used in the second attitude calculation mode. In detail, the mode selecting module 23 may set the positioning calculation results corresponding to the sets of antenna and receiving module of which the reception states are good, as a positioning calculation result to be used for the attitude calculation.

If the number of sets of antenna and receiving module of which the reception states are good is below the threshold Nth for the mode selection, the mode selecting module 23 may select an unable mode for the attitude calculation. The threshold Nth is set to 3, for example. Thus, the attitude can certainly be calculated even when only the positioning signals are used.

The mode selecting module 23 may output the selected mode to the attitude calculating module 24. Here, if it is in the second attitude calculation mode, the mode selecting module 23 may also output to the attitude calculating module 24 the setting condition of the positioning data to be used for the attitude calculation.

The attitude calculating module 24 may perform the attitude calculation by using the mode selected by the mode selecting module 23. The attitude in the present disclosure may be comprised of a three-dimensional attitude angle. In detail, the three-dimensional attitude angle may be comprised of an azimuth angle or bearing (yaw angle) $\psi$, a roll angle $\varphi$, and a pitch angle $\theta$. The attitude calculating module 24 may calculate a base-line vector between the antennas described above based on an integrated value of the carrier phase, for example. The attitude calculating module 24 may also calculate a direction cosine vector based on the positions of the antennas calculated by the position calculating module 21, and the positions of the positioning satellites acquired from the navigation message. Then, the attitude calculating module 24 may calculate the attitude angle by using a known method based on the base-line vector and the direction cosine vector.

If the first attitude calculation mode is set, the attitude calculating module 24 may calculate the three-dimensional attitude angle based on the positioning signals (i.e., the bearing (yaw angle) $\psi g$, the roll angle $\varphi g$, and the pitch angle $\theta g$), by using the positioning calculation result of all the sets of antenna and receiving module and the carrier phase.

If the second attitude calculation mode is set, the attitude calculating module 24 may calculate the three-dimensional attitude angle based on the positioning signals, by using the positioning calculation result set as the target for the attitude calculation (the positioning calculation result of which the reception state is estimated to be good), and the corresponding carrier phase.

By using such a configuration and processing, the attitude measuring device 10 can perform the attitude calculation as precise as possible by using the positioning signals with the good reception state. In more detail, if the reception state is good for all the sets of antenna and receiving module, as the first attitude calculation mode, the attitude measuring device 10 can perform the attitude calculation with high precision by using all the received positioning signals. If the reception state is good for some of the sets of antenna and receiving module, as the second attitude calculation mode, the attitude measuring device 10 can perform the attitude calculation by using a plurality of positioning signals of which the reception states are good. The second attitude calculation mode may be less in the number of positioning signals to be used for the attitude calculation than the first attitude calculation mode. However, also in the second attitude calculation mode, since the number of positioning signals of which the reception states are good is more than enough for the attitude calculation, the attitude calculation can achieve more than a given level of precision.

Note that, when the unable mode for the attitude calculation is set, the attitude calculating module 24 may not perform a new attitude calculation but output an error message, for example. Thus, the attitude measuring device 10 can suppress a fall of the accuracy of the attitude calculation. Further, the attitude measuring device 10 can make a user recognize that the attitude calculation has been interrupted.

Note that, in the above description, the reception state estimating module 22 may estimate the reception state based on whether the calculation of the position could have been performed. However, the reception state estimating module 22 may estimate the reception state based on whether the carrier phase could have been acquired. In this case, the reception state estimating module 22 may acquire the carrier phase from the position calculating module 21 or the receiving modules 41-44. For example, if the carrier phase could have been acquired, the reception state estimating module 22 estimates that the reception state is good, and if the carrier phase could not have been acquired, it estimates that the reception state is poor.

Alternatively, the reception state estimating module 22 may estimate the reception state based on the integrated value of the carrier phase. In this case, for example, the reception state estimating module 22 sets a threshold for the integrated value of the carrier phase. The threshold can be set based on the minimum integrated value of the carrier phase which is required for the attitude calculation, for example. If the integrated value of the carrier phase is above the threshold, the reception state estimating module 22 may estimate that the reception state is good, and if this integrated value of the carrier phase is below the threshold, it may estimate that the reception state is poor.

Alternatively, the reception state estimating module 22 may estimate the reception state based on a variation of the position. In this case, for example, the reception state estimating module 22 sets a threshold for the variation of the position. The threshold can be set based on a speed which is calculated immediately before, for example. If the variation in the position calculated at two time points is below the threshold, the reception state estimating module 22 may estimate that the reception state is good, and if this variation exceeds the threshold, it may estimate that the reception state is poor.

Further, the reception state estimating module 22 may estimate the reception state by using a variance of the position. In this case, the reception state estimating module 22 sets a threshold for the variance of the position, for example. If the variance of the position is below the threshold, the reception state estimating module 22 may estimate that the reception state is good, and if the variance of the position exceeds the threshold, it may estimate that the reception state is poor.

Further, the reception state estimating module 22 may estimate the reception state by using a reception intensity of the positioning signal for every set of antenna and receiving module. That is, the reception state estimating module 22 may estimate the reception state by comparing the reception intensities of the positioning signal received in common to the plurality of sets of antenna and receiving module. In this case, the receiving modules 41-44 may acquire the reception intensity for every received positioning signal, and output it to the reception state estimating module 22.

The reception state estimating module 22 may measure the reception intensities of the sets of antenna and receiving module for the positioning signal common to each set, and for the set of which the reception intensity is lower than other sets by more than a given level, it may estimate that the reception state is poor.

In this embodiment, although the number of sets of antenna and receiving module is four, it may be five or more. In this case, the threshold Nth for the mode selection may suitably be set in consideration of the accuracy of the attitude calculation, the processing load, etc., as long as it may be three or more.

In the above description, the processing performed by the calculating module 20 may be performed by the individual functional modules. However, each processing described above may be programmed and stored in storage medium etc., and the above-described function may be achieved by a processing unit such as a computer executing the program.

Figure 3:
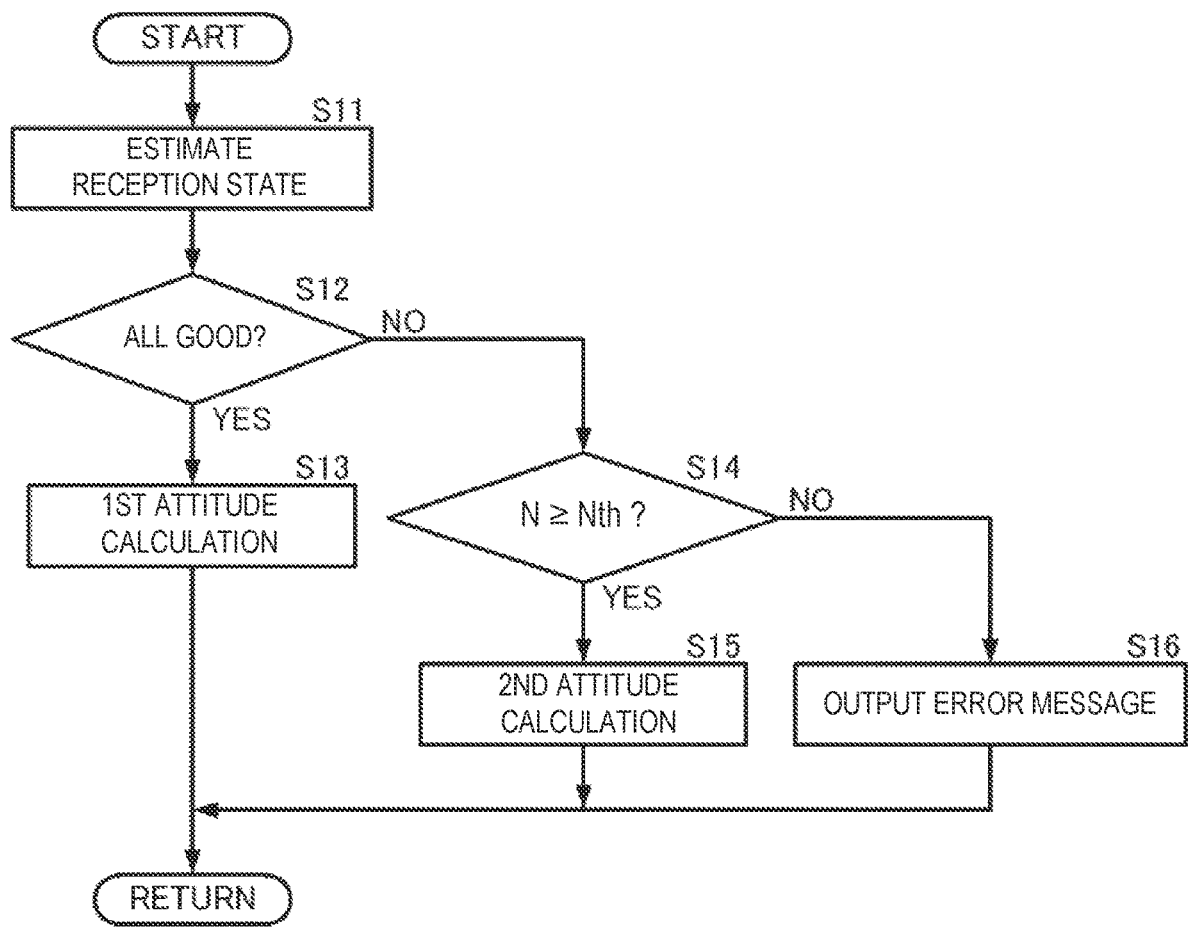
FIG. 3 is a first flowchart of an attitude measuring method according to Embodiment 1.

FIG. 3 is a first flowchart of an attitude measuring method according to Embodiment 1. Note that explanation of a part overlapping with the above description for concrete content of each processing is omitted, and, below, only a part which has not been described will be described.

First, the processing unit may estimate the reception state of every set of antenna and receiving module by using the positioning calculation result for every antenna (S11). If the reception states of all the sets are good (S12: YES), the processing unit may perform the attitude calculation in the first attitude calculation mode (S13). That is, the processing unit may perform the attitude calculation by using the positioning calculation result for all the sets of antenna and receiving module, and the carrier phase.

If the reception states of at least some sets are not good (S12: NO), the processing unit may detect the number of sets N of which the reception state is good. If the number of sets N with the good reception state is the threshold Nth or above (S14: YES), the processing unit may perform the attitude calculation in the second attitude calculation mode (S15). That is, the processing unit may perform the attitude calculation by using the positioning calculation result for the sets of antenna and receiving module of which the reception state are good, and the carrier phase, without using the positioning calculation result for the sets of antenna and receiving module of which the reception states are poor, and the carrier phase.

If the number of sets N with the good reception state is below the threshold Nth (S14: NO), the processing unit may output the error message (S16).

Figure 4:
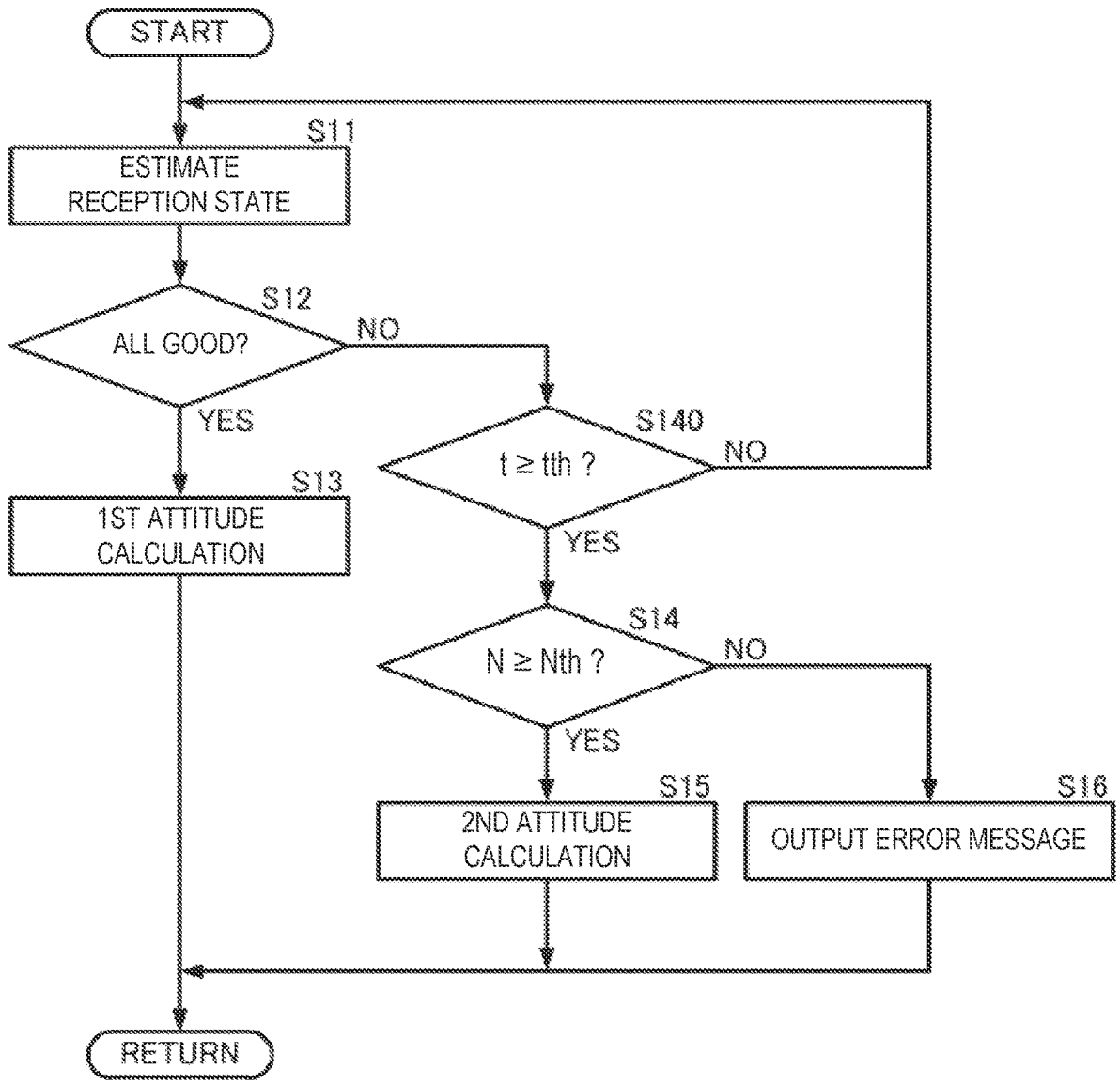
FIG. 4 is a second flowchart of the attitude measuring method according to Embodiment 1.

Note that the processing unit may set a given standby time during the determination based on the number of good sets N. FIG. 4 is a second flowchart of the attitude measuring method according to Embodiment 1. Note that, below, only differences from the first flowchart illustrated in FIG. 3 will be described.

If the reception states of at least some sets are not good (S12: NO), the processing unit may wait until a threshold time tth for the start of the mode determination. Also during the standby time (S140: NO), the processing unit may determine the reception state by using the newly-obtained positioning calculation result (S11). In the meantime, if the reception states of all the sets become good (S12: YES), the processing unit may perform the attitude calculation in the first attitude calculation mode (S13). Then, the count of the standby time is reset.

If it becomes the threshold time tth for the start of the mode determination (S140: YES), the processing unit may count the number of sets N for which the reception states are good (S14), and it may perform the selection of the attitude calculation in the second attitude calculation mode, or the output of the error message, which are described above.

By using such processing, the processing unit can suppress that the mode becomes the second attitude calculation mode, when the reception state is unstable, while the antenna or the receiving module are not failed.

Figure 5:
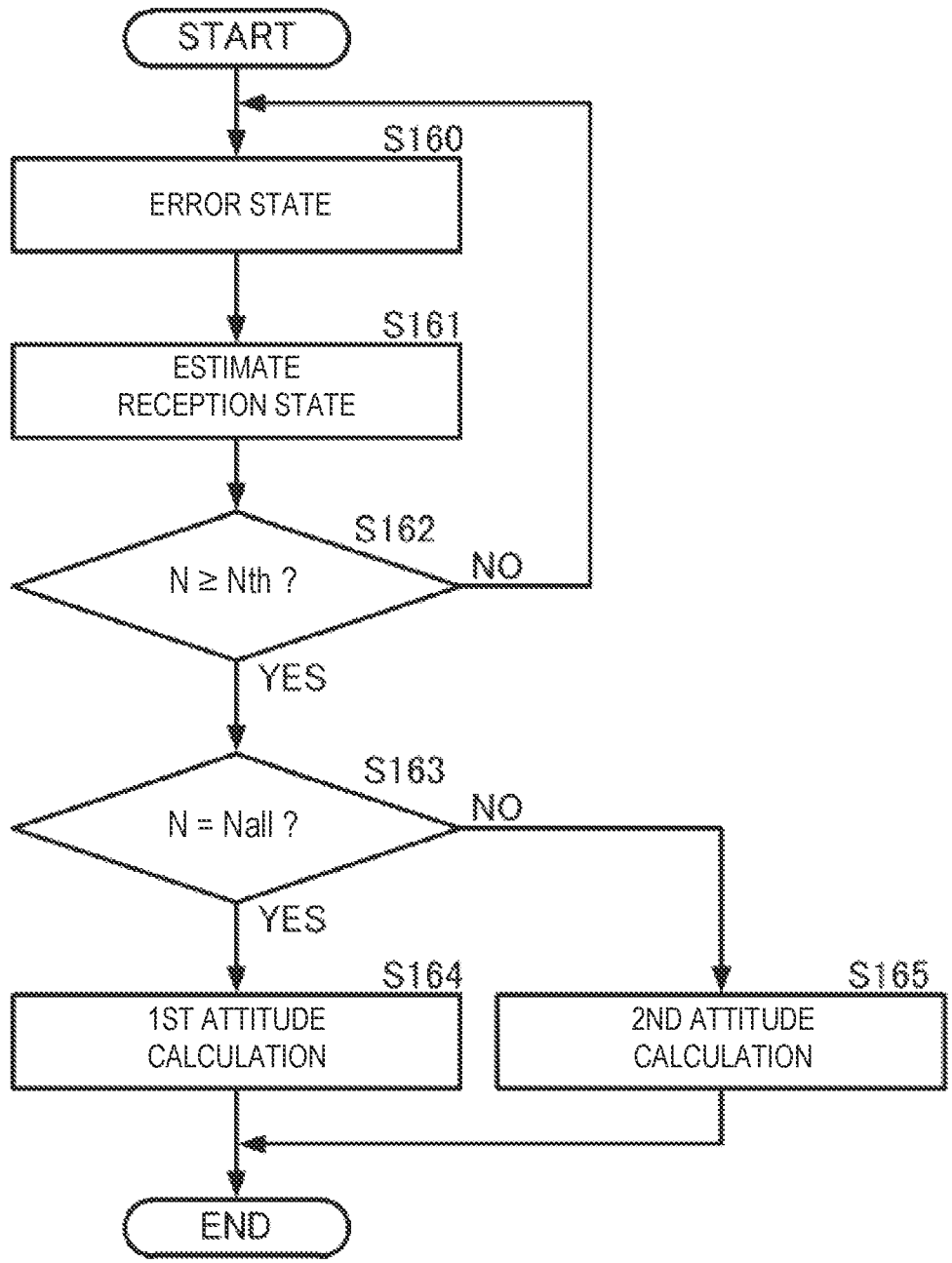
FIG. 5 is a flowchart illustrating a return processing from an error state.

Note that, for returning from the error state (the state where the error message is outputted), the following method may be used, for example. FIG. 5 is a flowchart illustrating the return processing from the error state.

Even if it is in the error state (S160), the processing unit may sequentially estimate the reception state by using the sequentially-obtained positioning calculation result (S161). Until the number of sets N with the good reception state becomes the threshold Nth or above (S162: NO), the processing unit may repeat this processing.

If the number of sets N with the good reception state becomes the threshold Nth or above (S162: YES), the processing unit may resume the attitude calculation. Here, if the reception state is good (N=Nall) for all the sets (S163: YES), the processing unit may perform the attitude calculation in the first attitude calculation mode. If the reception state is poor for some of the sets (S163: NO), the processing unit may perform the attitude calculation in the second attitude calculation mode.

Embodiment 2

Figure 6:
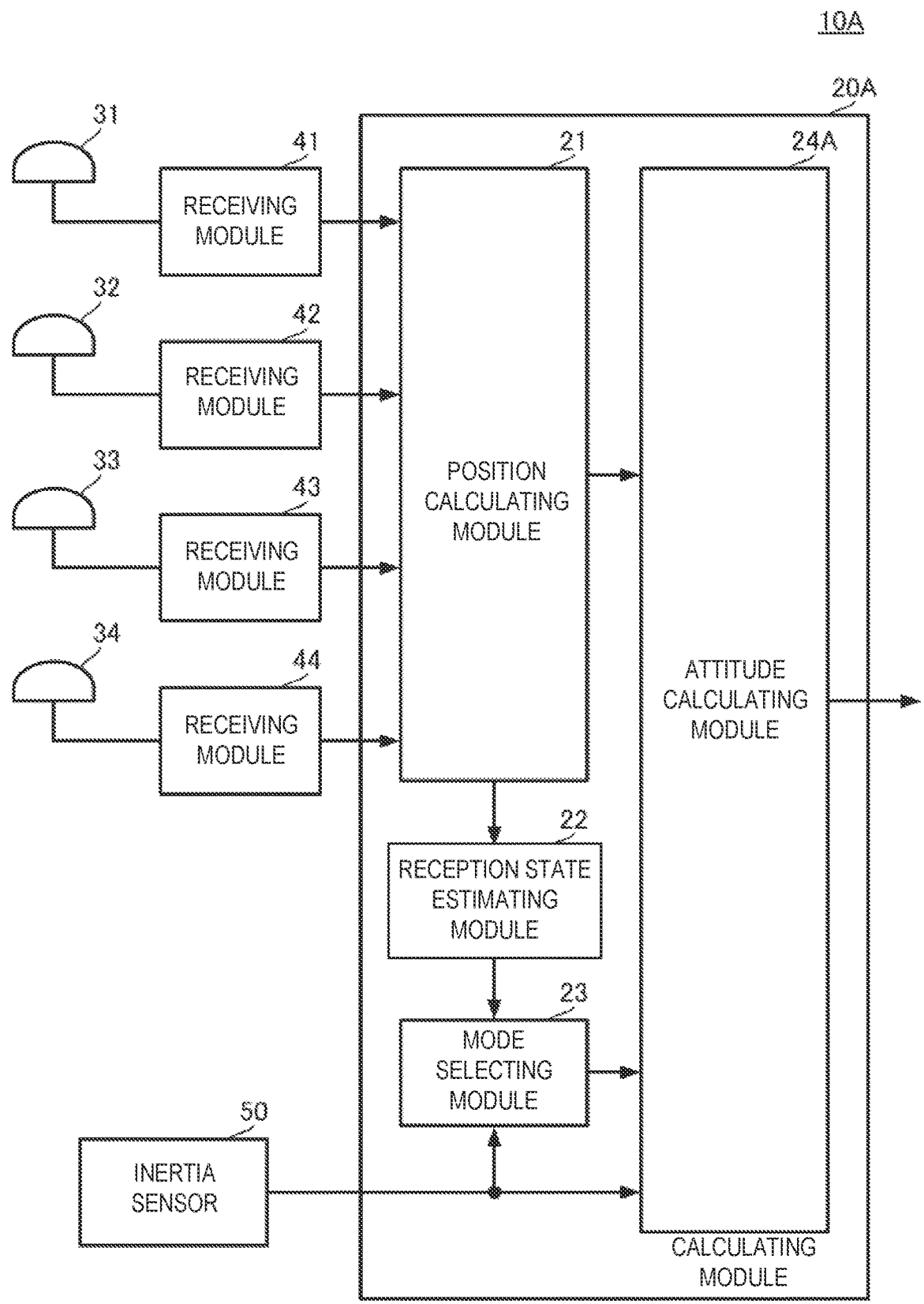
FIG. 6 is a functional block diagram illustrating a configuration of an attitude measuring device according to Embodiment 2.

An attitude measuring device, an attitude measuring method, and an attitude measurement program according to Embodiment 2 is described with reference to the drawings. FIG. 6 is a functional block diagram illustrating a configuration of the attitude measuring device according to Embodiment 2.

As illustrated in FIG. 6, an attitude measuring devices 10A according to Embodiment 2 differs from the attitude measuring device 10 according to Embodiment 1 in that an inertia sensor 50 is provided, and processing of a calculating module 20A (processing circuitry) accompanying therewith. Other configurations of the attitude measuring device 10A are similar to those of the attitude measuring device 10, and therefore, explanation of the similar part is omitted. Note that the inertia sensor 50 may be provided integrally with or separately from the attitude measuring device 10A.

The inertia sensor 50 may be installed in a movable body where the antenna 31-34 are installed. The inertia sensor 50 may be provided at least with a triaxial angular velocity sensor. The inertia sensor 50 may be provided with a triaxial acceleration sensor or other sensors.

The inertia sensor 50 may measure angular velocities in three axes which are perpendicular to each other in a body coordinate system of the movable body (inertia sensor system angular velocity), i.e., measure angular velocities for calculating a bearing (yaw angle) $\psi i$ a roll angle $\varphi i$, and a pitch angle $\theta i$. The inertia sensor 50 may output the inertia sensor system angular velocity to an attitude calculating module 24A and the mode selecting module 23 of the calculating module 20A.

The mode selecting module 23 may select the attitude calculation mode by using the existence of the inertia sensor system angular velocity, and the reception state. In detail, a selecting condition of the first attitude calculation mode by using the positioning calculation result is the same as the content described above.

Further, if the selecting condition of the first attitude calculation mode is satisfied and the inertia sensor system angular velocity is inputted, the mode selecting module 23 may select a first integrated attitude calculation mode. On the other hand, if the selecting condition of the first attitude calculation mode is satisfied and the inertia sensor system angular velocity is not inputted, the mode selecting module 23 may select the first attitude calculation mode.

If the selecting condition of the second attitude calculation mode is satisfied and the inertia sensor system angular velocity is inputted, the mode selecting module 23 may select a second integrated attitude calculation mode. On the other hand, if the selecting condition of the second attitude calculation mode is satisfied and the inertia sensor system angular velocity is not inputted, the mode selecting module 23 may select the second attitude calculation mode.

If the selecting condition of the second attitude calculation mode is not satisfied and the inertia sensor system angular velocity is inputted, the mode selecting module 23 may select a third attitude calculation mode. The third attitude calculation mode is to calculate the attitude angle by using the inertia sensor system angular velocity, for the attitude angle which is unable to be calculated based on the positioning calculation result. On the other hand, if the selecting condition of the second attitude calculation mode is not satisfied and the inertia sensor system angular velocity is not inputted, the mode selecting module 23 may output the error message.

The attitude calculating module 24A may calculate the attitude angle according to the selected attitude calculation mode. Here, the attitude calculating module 24A may perform the attitude calculation according to the number of antennas with the good reception state and antennas with the poor reception state, the spatial relationship, and the combination of the inputted inertia sensor system angular velocities (the attitude angle of the inertia sensor system). This processing may be performed when the mode selecting module 23 selects the attitude calculation mode.

FIG. 7 is a table illustrating a relation between the number of normal sets N, the failure state, the position, the speed, and the attitude angle in the positioning coordinate system, and the attitude angle in the inertia sensor system. In FIG. 7, the normal antenna may correspond to a set of antenna and receiving module for which the reception state is good as described above. The failure state may be a view illustrating a distribution of the sets of antenna and receiving module with the good reception state and the sets of antenna and receiving module with the poor reception state. In the row of the failure state, a black circle indicates the antenna in the set of antenna and receiving module with the good reception state, and a broken-line circle with X indicates the antenna in the set of antenna and receiving module with the poor reception states. Further, an arrow indicates the bow direction.

(N=4)

In this case, all the sets of antennas and receiving modules are good in the reception state. This is a case of the first attitude calculation mode described above.

The attitude calculating module 24A may calculate the attitude by using the positioning calculation result for all the sets of antennas and receiving modules, and the carrier phase. Here, if the inertia sensor system angular velocity is obtained, the attitude calculating module 24A may calculate the attitude by using the positioning calculation result, the carrier phase, and the first integrated attitude calculation mode using the inertia sensor system angular velocity.

In the first integrated attitude calculation mode, the attitude calculating module 24A may calculate the attitude, while estimating simultaneously a bias error contained in the inertia sensor system angular velocity and suppressing the influence of the bias error. Thus, the attitude measuring device 10A can perform a more-precise attitude calculation.

(N=3)

In this case, some sets of antennas and receiving modules are poor in the reception state, where the number of sets with the good reception state is the threshold Nth or above. This is a case of the second attitude calculation mode described above.

The attitude calculating module 24A may calculate the attitude by using the positioning calculation result for the sets of antennas and receiving modules with the good reception state, and the carrier phase. Here, if the inertia sensor system angular velocity is obtained, the attitude calculating module 24A may calculate the attitude by using the positioning calculation result, the carrier phase, and the second integrated attitude calculation mode using the inertia sensor system angular velocity.

In the second integrated attitude calculation mode, the attitude calculating module 24A may calculate the attitude, while simultaneously estimating the bias error etc. contained in the inertia sensor system angular velocity and suppressing the influence of the bias error. Thus, the attitude measuring device 10A can perform a more-precise attitude calculation.

Note that, in this case, the attitude calculating module 24A can perform similar processing, even if the position of the antenna with the poor reception state is anywhere.

(N=2)

In this case, some sets of antennas and receiving modules are poor in the reception state, where the number of sets with the good reception state is below the threshold Nth. This is a case which corresponds to neither the first attitude calculation mode, nor the first integrated attitude calculation mode, nor the second attitude calculation mode, nor the second integrated attitude calculation mode, which are described above.

The attitude calculating module 24A may calculate the attitude by using the positioning calculation result for the sets of antennas and receiving modules with the good reception state, and the carrier phase. Here, if the inertia sensor system angular velocity is obtained, the attitude calculating module 24A may calculate, using the inertia sensor system angular velocity, the attitude angle which is unable to be calculated based on the positioning calculation result and the carrier phase.

In more detail, if the reception state is poor for two antennas (sets of antennas and receiving modules) lined up in the bow direction, the attitude calculating module 24A cannot calculate the roll angle φg based on the positioning calculation result and the carrier phase. In this case, the attitude calculating module 24A may calculate the roll angle φi based on the inertia sensor system angular velocity. Thus, the attitude calculating module 24A may calculate the attitude comprised of the attitude angles of the perpendicular three axes.

Further, if the reception state is poor for two antennas (sets of antennas and receiving modules) lined up in a direction (the port-and-starboard direction) perpendicular to the bow direction, the attitude calculating module 24A cannot calculate the pitch angle θg based on the positioning calculation result and the carrier phase. In this case, the attitude calculating module 24A may calculate the pitch angle θi based on the inertia sensor system angular velocity. Thus, the attitude calculating module 24A may calculate the attitude comprised of the attitude angles of the perpendicular three axes.

Further, in the first column of two columns lined up in the bow direction, if the reception state is poor for the antenna on the bow side and the reception state is good for the antenna on the stern side, and in the second column, if the reception state is good for the antenna on the bow side and the reception state is poor for the antenna on the stern side, the attitude calculating module 24A is unable to calculate the roll angle φg and the pitch angle θg based on the positioning calculation result and the carrier phase. In this case, the attitude calculating module 24A may calculate the roll angle φi and the pitch angle θi based on the inertia sensor system angular velocity. Thus, the attitude calculating module 24A may calculate the attitude comprised of the attitude angles of the perpendicular three axes.

(N=1)

In this case, the reception state becomes poor except for one set of antenna and receiving module. This is a case which corresponds to neither the first attitude calculation mode, nor the first integrated attitude calculation mode, nor the second attitude calculation mode, nor the second integrated attitude calculation mode, and is another processing in the third attitude calculation mode.

In such a situation, if all the inertia sensor system angular velocities are obtained, the attitude angles of the perpendicular three axes may be calculated using the angular velocities.

Thus, even if the attitude measuring device 10A is unable to calculate at least some of the attitude angles of the perpendicular three axes based on the positioning calculation result and the carrier phase, it may calculate all the attitude angles of the perpendicular three axes based on the inertia sensor system angular velocities as the third attitude calculation mode. Thus, even if the attitude measuring device 10A does not satisfy the condition of the second integrated attitude calculation mode, it can increase the opportunity for calculating all the attitude angles of the perpendicular three axes.

In the above description, the processing to be performed by the calculating module 20A may be performed by the individual functional modules. However, each processing described above may be programmed and stored in storage medium etc., and the above-described function may be achieved by a processing unit such as a computer executing the program.

Figure 8:
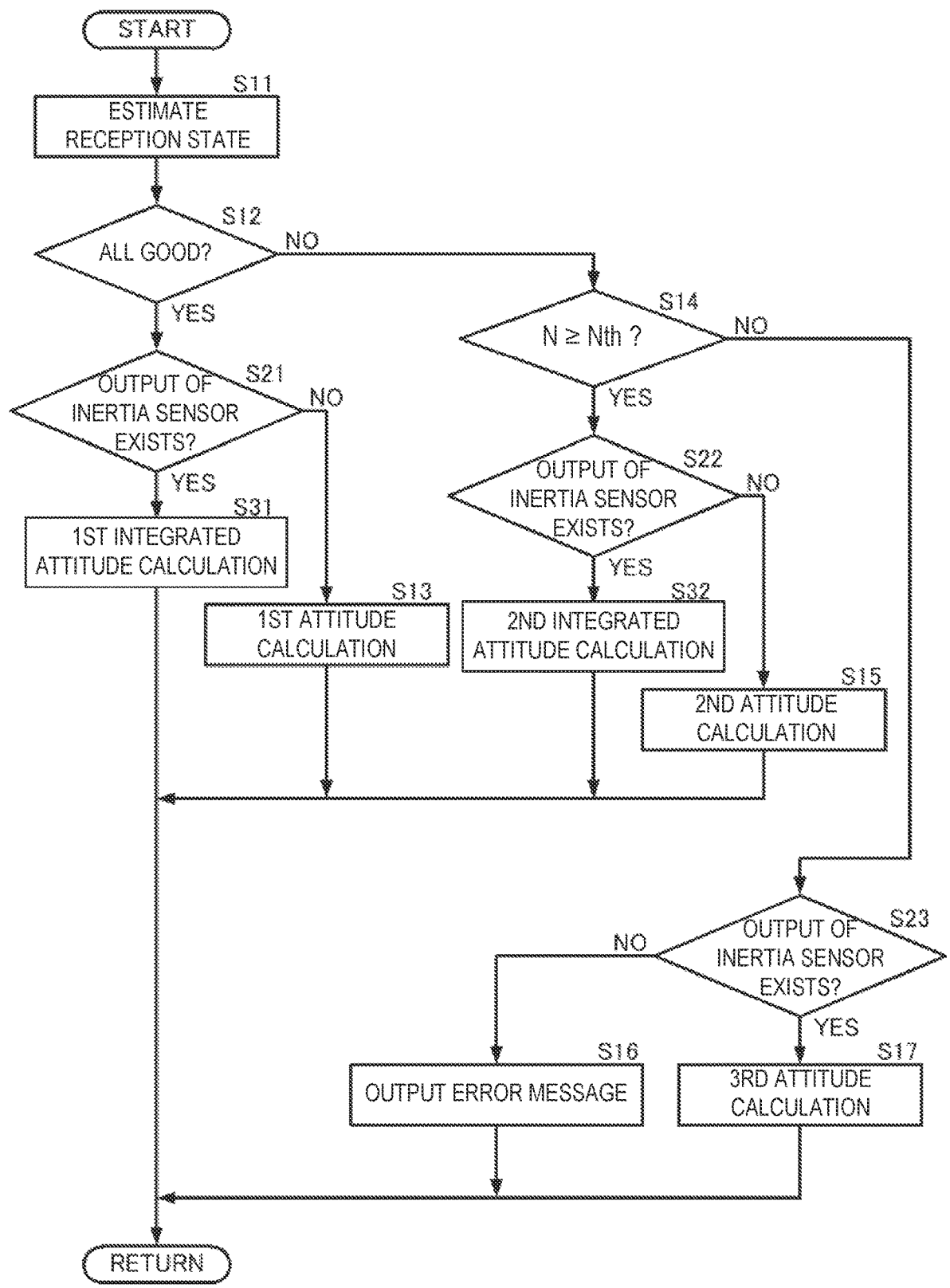
FIG. 8 is a first flowchart of an attitude measuring method according to Embodiment 2.

FIG. 8 is a first flowchart of the attitude measuring method according to Embodiment 2. Note that explanation of a part overlapping with the above description for concrete content of each processing is omitted, and, below, only a part which has not been mentioned will be described.

First, the processing unit may estimate the reception state of every set of antenna and receiving module by using the positioning calculation result for every antenna (S11). If the reception states of all the sets are good (S12: YES) and if there is an output of the inertia sensor (for example, the angular velocity) (S21: YES), the processing unit may perform the first integrated attitude calculation mode (S31). If the reception states of all the sets are good (S12: YES) and if there is no output of the inertia sensor (for example, the angular velocity) (S21: NO), the processing unit may perform the attitude calculation in the first attitude calculation mode (S13).

If the reception states of at least some sets are not good (S12: NO), the processing unit detects the number of sets N with the good reception state. If the number of sets N with the good reception state is the threshold Nth or above (S14: YES) and if there is the output of the inertia sensor (for example, the angular velocity) (S22: YES), the processing unit may perform the second integrated attitude calculation mode (S32). If the number of sets N with the good reception state is the threshold Nth or above (S14: YES) and if there is no output of the inertia sensor (for example, the angular velocity) (S22: NO), the processing unit may perform the attitude calculation in the second attitude calculation mode (S15).

If the number of sets N with the good reception state is below the threshold Nth (S14: NO) and if there is the output of the inertia sensor (for example, the angular velocity) (S23: YES), the processing unit may perform the third attitude calculation mode (S17). If the number of sets N with the good reception state is below the threshold Nth (S14: NO) and if there is no output of the inertia sensor (for example, the angular velocity) (S23: NO), the processing unit may output the error message (S16).

Note that, although in the above processing the integrated calculation is selectable, the integrated calculation may be omitted.

Figure 9:
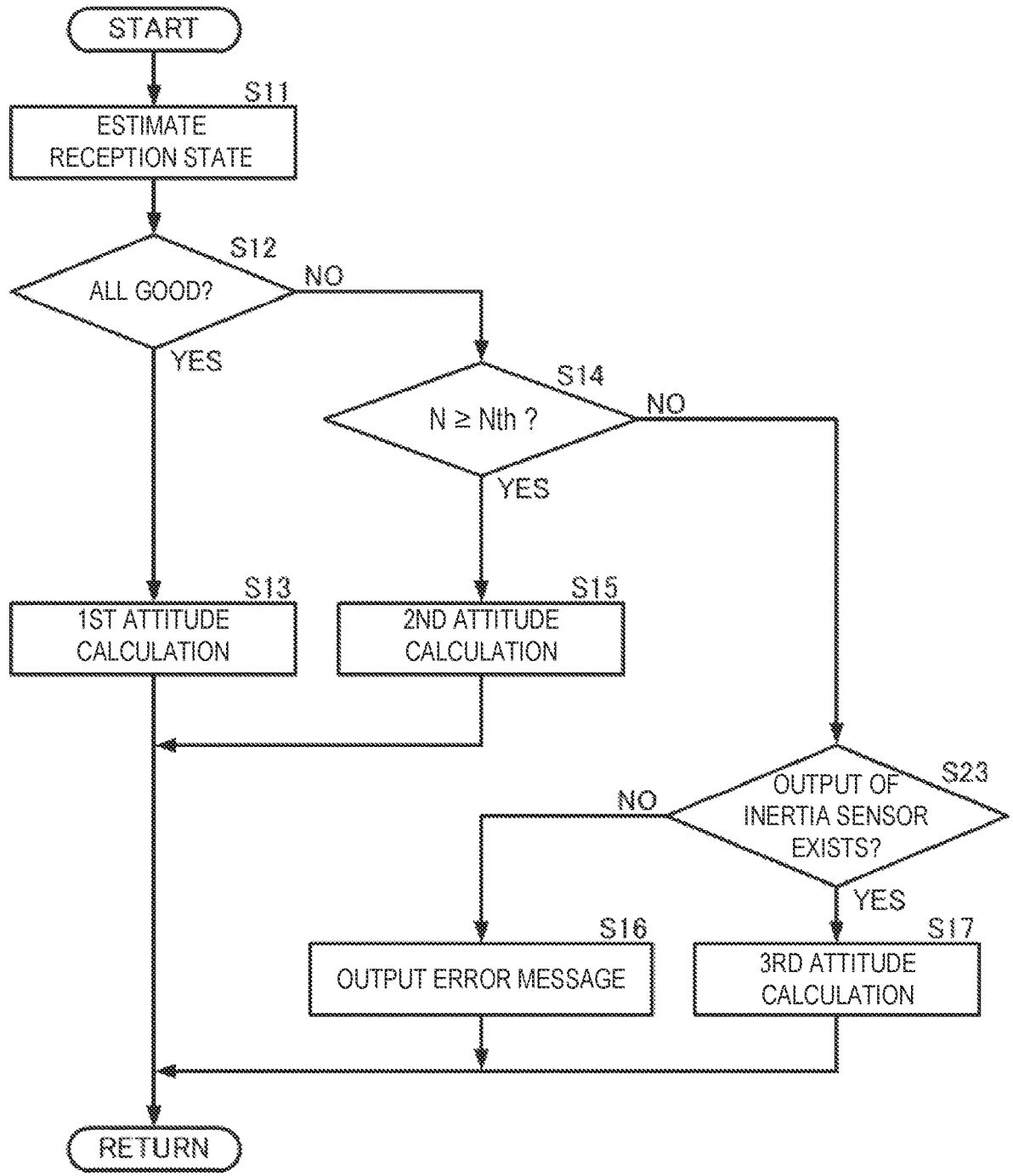
FIG. 9 is a second flowchart of the attitude measuring method according to Embodiment 2.

FIG. 9 is a second flowchart of the attitude measuring method according to Embodiment 2. Note that explanation of a part overlapping with the above description for concrete content of each processing is omitted, and, below, only a part which has not been mentioned will be described.

First, the processing unit may estimate the reception state of every set of antenna and receiving module by using the positioning calculation result for every antenna (S11). If the reception states of all the sets are good (S12: YES), the processing unit may perform the attitude calculation in the first attitude calculation mode (S13).

If the reception states of at least some sets are not good (S12: NO), the processing unit may detect the number of sets N with the good reception state. If the number of sets N with the good reception state is the threshold Nth or above (S14: YES), the processing unit may perform the attitude calculation in the second attitude calculation mode (S15).

If the number of sets N with the good reception state is below the threshold Nth (S14: NO) and if there is the output of the inertia sensor (for example, the angular velocity) (S23: YES), the processing unit may perform the third attitude calculation mode (S17). If the number of sets N with the good reception state is below the threshold Nth (S14: NO) and if there is no output of the inertia sensor (for example, the angular velocity) (S23: NO), the processing unit may output the error message (S16).

Derived Example of Antenna Layout

In the above description, the four antennas may be disposed in the square shape. However, to the attitude measuring device of the present invention, the layout in which four or more antennas are provided and four or more base-line vectors can be set is applicable.

Figure 10A:
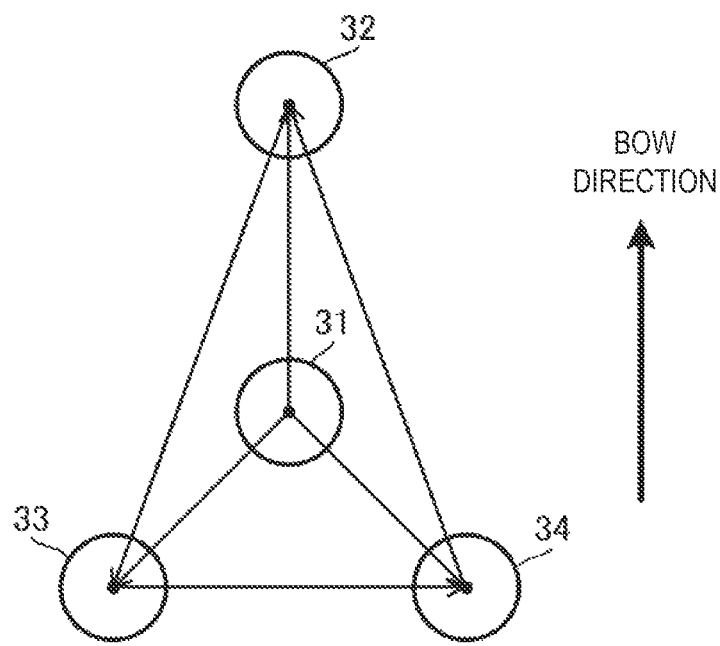
FIGS. 10(A) and 10(B) are plan views illustrating another mode of the layout of the antennas.
Figure 10B:
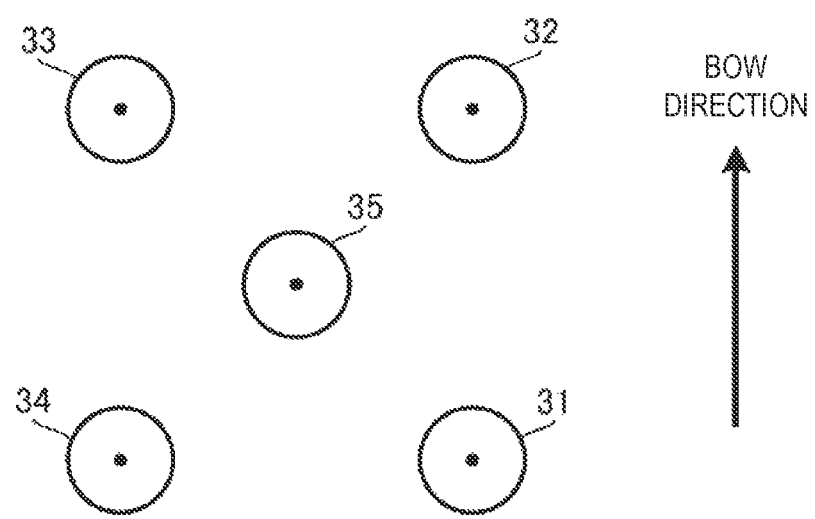

FIGS. 10(A) and 10(B) are plan views illustrating other modes of the layout of the antennas.

In the configuration illustrated in FIG. 10(A), the attitude measuring device may be provided with four antennas 31-34. The antennas 32-34 may be disposed on concentric circles centering on the antenna 31. The antenna 32 may be disposed on the bow side of the antenna 31. A straight line connecting the antenna 31 and the antenna 32 (i.e., the base line connecting the antenna 31 and the antenna 32) may be parallel to the bow direction. The antennas 33 and 34 may be disposed on the stern side of the antenna 31. The antennas 33 and 34 may not exist on a straight line connecting the antenna 31 and the antenna 32, and its extended line. The straight line connecting the antenna 33 and the antenna 34 may be perpendicular to the bow direction.

In the configuration illustrated in FIG. 10(B), the attitude measuring device may be provided with five antennas 31-35. The layout of the four antennas 31-34 may be the same as the above-described configuration illustrated in FIG. 2. Here, the length between the four antennas 31-34 illustrated in FIG. 10(B) may differ from FIG. 2. The antenna 35 may be disposed at the center of the square formed by the four antennas 31-34.

These configurations are examples, and other configurations may be applicable as long as they satisfy the above-described layout conditions of the antennas. Further, in each of the above-described layouts, at least one base-line vector is parallel to the bow direction. By such a layout, the calculation processing of the attitude angle becomes easier. However, the layout is applicable to the configuration of the present invention, even if there is no base-line vector parallel to the bow direction. In this case, an angle formed between the bow direction and each base-line vector may be determined in advance.

The configurations illustrated in the above-described embodiments etc. may suitably be combined, and the combination also accomplishes operation and effects corresponding to this combination.

DESCRIPTION OF REFERENCE CHARACTERS 10, 10 A: Attitude Measuring Device
20, 20A: Calculating Module (Processing Circuitry)
21: Position Calculating Module
22: Reception State Estimating Module
23: Mode Selecting Module
24, 24 A: Attitude Calculating Module
31, 32, 33, 34, 35: Antenna
41, 42, 43, 44: Receiving Module
50: Inertia Sensor Terminology It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. An attitude measuring device, comprising:
    four or more antennas configured to receive positioning signals and output reception signals, respectively;
    receivers provided for the respective antennas and configured to output positioning data containing a carrier phase based on the reception signals; and
    processing circuitry configured to:
        carry out a positioning calculation of a position of each of the antennas by using the positioning data relevant to each of the antennas and output a positioning calculation result;
        estimate a reception state of the positioning data based on the positioning calculation result;
        determine a number of normal antennas based on the reception state of the positioning data;
        select between a first attitude calculation mode using four or more positioning data with a good reception state and a second attitude calculation mode using three or less positioning data with the good reception state based on the number of normal antennas; and
        calculate an attitude by using the selected attitude calculation mode, wherein
        the first attitude calculation mode is selected when the number of normal antennas meets a predetermined threshold within a predetermined time period, and
        the second attitude calculation mode is selected when the number of normal antennas does not meet the predetermined threshold within the predetermined time period.

2. The attitude measuring device of claim 1, comprising an inertia sensor configured to measure a three-dimensional attitude angle and output an inertia attitude angle,
    wherein the processing circuitry calculates the attitude by using the positioning data and the inertia attitude angle.

3. The attitude measuring device of claim 2, wherein the processing circuitry further has a third attitude calculation mode using two or less positioning data with the good reception state,
    wherein, when the number of normal antennas does not meet the predetermined threshold within the predetermined time period and the number of normal antennas is three, the processing circuitry selects the second attitude calculation mode, and
    wherein, when the number of normal antennas does not meet the predetermined threshold within the predetermined time period and the number of normal antennas is two or less, the processing circuitry selects the third attitude calculation mode.

4. The attitude measuring device of claim 3, wherein, when the third attitude calculation mode is selected and only one positioning data with the good reception state is obtained, the processing circuitry calculates the attitude only using the inertia attitude angle.

5. The attitude measuring device of claim 4, wherein, when the third attitude calculation mode is selected and two positioning data with the good reception state are obtained, the processing circuitry calculates the attitude by using the inertia attitude angle for supplementing an attitude angle by the positioning data based on a layout of two antennas.

6. The attitude measuring device of claim 4, wherein the processing circuitry estimates the reception state by using an independent positioning result calculated from the positioning data, or a detection result of the carrier phase.

7. The attitude measuring device of claim 3, wherein, when the third attitude calculation mode is selected and two positioning data with the good reception state are obtained, the processing circuitry calculates the attitude by using the inertia attitude angle for supplementing an attitude angle by the positioning data based on a layout of two antennas.

8. The attitude measuring device of claim 7, wherein the processing circuitry estimates the reception state by using an independent positioning result calculated from the positioning data, or a detection result of the carrier phase.

9. The attitude measuring device of claim 3, wherein the processing circuitry estimates the reception state by using an independent positioning result calculated from the positioning data, or a detection result of the carrier phase.

10. The attitude measuring device of claim 2, wherein the processing circuitry estimates the reception state by using an independent positioning result calculated from the positioning data, or a detection result of the carrier phase.

11. The attitude measuring device of claim 1, wherein the processing circuitry estimates the reception state by using an independent positioning result calculated from the positioning data, or a detection result of the carrier phase.

12. A method of measuring an attitude, comprising:
receiving, with four or more antennas, positioning signals and outputting reception signals, respectively;
outputting, for every reception signal of the antennas, positioning data containing a carrier phase based on the reception signals;
carrying out a positioning calculation of a position of each of the antennas by using the positioning data relevant to each of the antennas and outputting a positioning calculation result;
estimating a reception state of the positioning data based on the positioning calculation result;
determining a number of normal antennas based on the reception state of the positioning data;
selecting between a first attitude calculation mode using four or more positioning data with a good reception state and a second attitude calculation mode using three or less positioning data with the good reception state based on the number of normal antennas; and
calculating an attitude by using the selected attitude calculation mode, wherein
the first attitude calculation mode is selected when the number of normal antennas meets a predetermined threshold within a predetermined time period, and
the second attitude calculation mode is selected when the number of normal antennas does not meet the predetermined threshold within the predetermined time period.

13. The attitude measuring method of claim 12, comprising:
measuring, with an inertia sensor, a three-dimensional attitude angle and outputting an inertia attitude angle; and
calculating the attitude by using the positioning data and the inertia attitude angle.

14. The attitude measuring method of claim 13, further having a third attitude calculation mode using two or less positioning data with the good reception state,
wherein, when the number of normal antennas does not meet the predetermined threshold within the predetermined time period and the number of normal antennas is three, the second attitude calculation mode is selected, and
wherein, when the number of normal antennas does not meet the predetermined threshold within the predetermined time period and the number of normal antennas is two or less, the third attitude calculation mode is selected.

15. The attitude measuring method of claim 14, wherein, when the third attitude calculation mode is selected and only one positioning data with the good reception state is obtained, the attitude is calculated only using the inertia attitude angle.

16. The attitude measuring method of claim 14, wherein, when the third attitude calculation mode is selected and two positioning data with the good reception state are obtained, the attitude is calculated by using the inertia attitude angle for supplementing an attitude angle by the positioning signals based on a layout of two antennas.

17. A non-transitory computer-readable recording medium storing a program causing a processor of an attitude measuring device, a processing performed by the processor comprising:
receiving, with four or more antennas, positioning signals and outputting reception signals, respectively;
outputting, for every reception signal of the antennas, a plurality of positioning data containing a carrier phase based on the reception signals;
carrying out a positioning calculation of a position of each of the antennas by using the positioning data relevant to each of the antennas and outputting a positioning calculation result;
estimating a reception state of the positioning data based on the positioning calculation result;
determining a number of normal antennas based on the reception state of the positioning data;
selecting between a first attitude calculation mode using four or more positioning data with a good reception state and a second attitude calculation mode using three or less positioning data with the good reception state based on the number of normal antennas; and
calculating an attitude by using the selected attitude calculation mode, wherein
the first attitude calculation mode is selected when the number of normal antennas meets a predetermined threshold within a predetermined time period, and
the second attitude calculation mode is selected when the number of normal antennas does not meet the predetermined threshold within the predetermined time period.

18. The attitude measurement program of claim 17, the processing further comprising:
measuring, with an inertia sensor, a three-dimensional attitude angle and outputting an inertia attitude angle; and
calculating the attitude by using the positioning data and the inertia attitude angle.

19. The attitude measurement program of claim 18, further having a third attitude calculation mode using two or less positioning data with the good reception state,
wherein, when the number of normal antennas does not meet the predetermined threshold within the predetermined time period and the number of normal antennas is three, the second attitude calculation mode is selected, and wherein, when the number of normal antennas does not meet the predetermined threshold within the predetermined time period and the number of normal antennas is two or less, the third attitude calculation mode is selected.

20. The attitude measurement program of claim 19, wherein, when the third attitude calculation mode is selected and only one positioning data with the good reception state is obtained, the attitude is calculated only using the inertia attitude angle.

* * * * *